United States Patent
Schwarz et al.

(10) Patent No.: US 10,031,619 B2
(45) Date of Patent: Jul. 24, 2018

(54) PROBABILISTIC PALM REJECTION USING SPATIOTEMPORAL TOUCH FEATURES AND ITERATIVE CLASSIFICATION

(71) Applicant: Carnegie Mellon University, Pittsburgh, PA (US)

(72) Inventors: Julia Schwarz, Pittsburgh, PA (US); Christopher Harrison, Pittsburgh, PA (US)

(73) Assignee: CARNEGIE MELLON UNIVERSITY, Pittsburg, PA (US)

(*) Notice: Subject to any disclaimer, the term of this patent is extended or adjusted under 35 U.S.C. 154(b) by 0 days.

(21) Appl. No.: 15/125,663

(22) PCT Filed: Apr. 14, 2015

(86) PCT No.: PCT/US2015/025676
§ 371 (c)(1),
(2) Date: Sep. 13, 2016

(87) PCT Pub. No.: WO2015/160752
PCT Pub. Date: Oct. 22, 2015

(65) Prior Publication Data
US 2017/0024073 A1    Jan. 26, 2017

Related U.S. Application Data

(60) Provisional application No. 61/995,578, filed on Apr. 14, 2014.

(51) Int. Cl.
*G06F 3/041* (2006.01)
*G06F 3/045* (2006.01)

(52) U.S. Cl.
CPC .................. *G06F 3/0418* (2013.01)

(58) Field of Classification Search
CPC ..... G06F 3/0416; G06F 3/044; G06F 3/04883
See application file for complete search history.

(56) References Cited

U.S. PATENT DOCUMENTS

| | | |
|---|---|---|
| 2009/0095540 A1 | 4/2009 | Zachet et al. |
| 2012/0050530 A1 | 3/2012 | Raman et al. |
| 2012/0182238 A1 | 7/2012 | Lee |
| 2012/0188176 A1 | 7/2012 | Uzelac et al. |
| 2012/0262407 A1 | 10/2012 | Hinckley et al. |

(Continued)

FOREIGN PATENT DOCUMENTS

| | | |
|---|---|---|
| WO | 2012111010 | 8/2012 |
| WO | 2013059488 | 4/2013 |

OTHER PUBLICATIONS

Extended European Search Report dated Nov. 7, 2017 for European Application No. 15779531.1, 6 pages.

(Continued)

*Primary Examiner* — Nan-Ying Yang
(74) *Attorney, Agent, or Firm* — Amin, Turocy & Watson, LLP

(57) ABSTRACT

The present invention is a palm rejection technique utilizing temporal features, iterative classification, and probabilistic voting. Touch events are classified based on features periodically extracted from time windows of increasing size, always centered at the birth of the event. The classification process uses a series of decision trees acting on said features.

15 Claims, 3 Drawing Sheets

(56) References Cited

U.S. PATENT DOCUMENTS

2013/0321303 A1     12/2013  Madanmohan
2014/0049495 A1*     2/2014  Westerman ........... G06F 3/0488
                                                          345/173
2014/0104191 A1*     4/2014  Davidson ............ G06F 3/04883
                                                          345/173
2014/0210788 A1      7/2014  Harrison et al.

OTHER PUBLICATIONS

European Office Action dated Nov. 24, 2017 for European Application No. 15779531.1, 1 page.
International Search Report dated Jul. 22, 2015 for PCT Application No. PCT/US15/25676, 1 page.

* cited by examiner

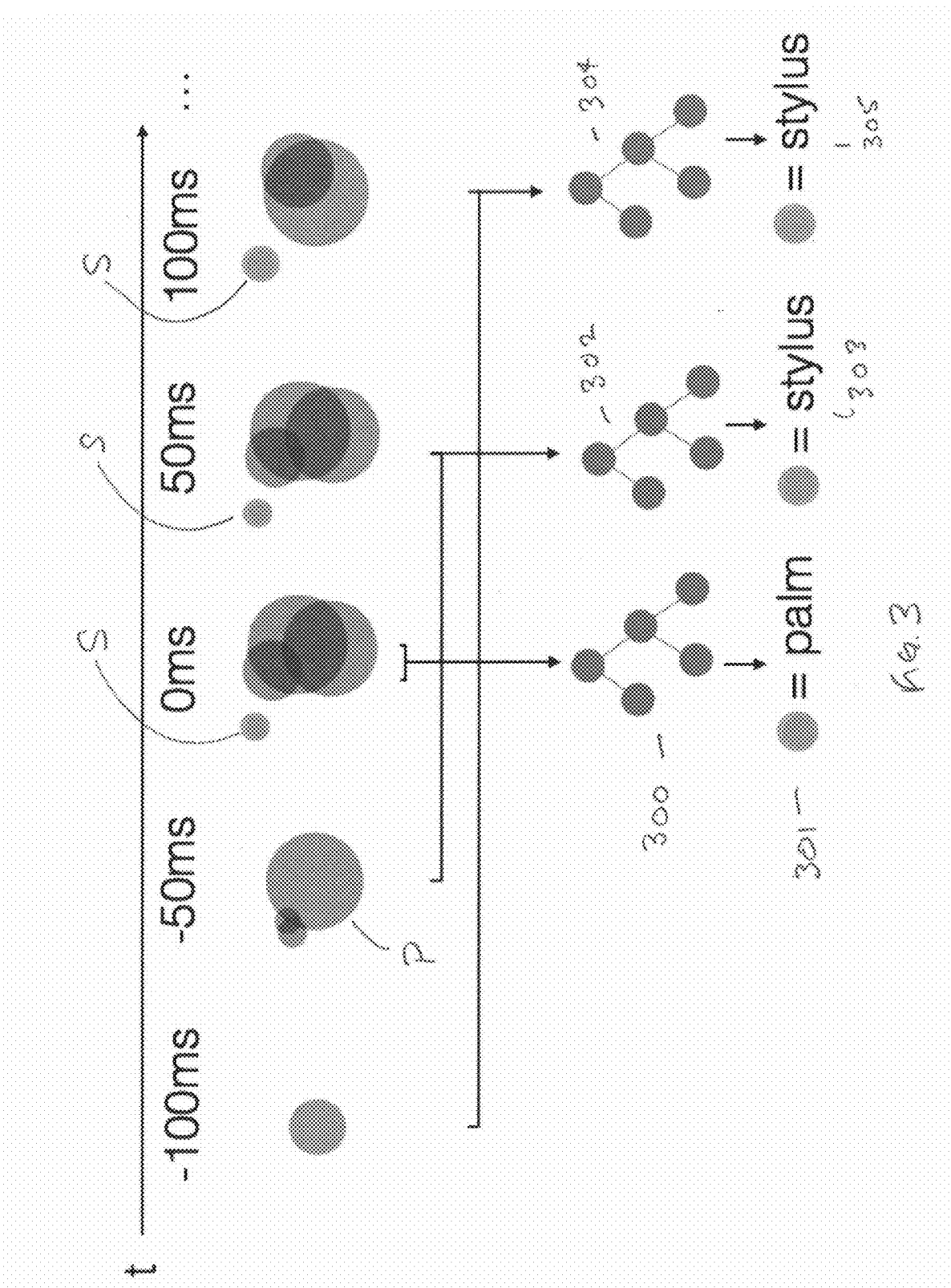

PROBABILISTIC PALM REJECTION USING SPATIOTEMPORAL TOUCH FEATURES AND ITERATIVE CLASSIFICATION

RELATED APPLICATIONS

This application is a national phase application filed under 35 U.S.C. § 371, claiming priority to PCT application PCT/US15/25676, filed Apr. 14, 2015, which claims the benefit of U.S. Provisional Patent Application No. 61/995,578, filed Apr. 14, 2014.

GOVERNMENT RIGHTS

This invention was made with government support under the NSF Number IIS1217929. The government has certain rights in this invention.

FIELD OF THE INVENTION

This invention relates to human/machine interaction, and, more specifically, relates to the interaction between a touch-sensitive screen of the type typically found on a tablet computer or a smartphone, and a human hand using a stylus.

BACKGROUND OF THE INVENTION

Tablet computers are often called upon to emulate classical pen-and-paper input. However, most touch devices today lack palm rejection features—most notably the highly popular Apple iPad tablets. Failure to reject palms effectively in a pen or touch input system results in ergonomic issues, accidental activation and unwanted inputs, precluding fluid and efficient use of these input systems. This issue is well known in the prior art.

Presently, the most reliable way to disambiguate stylus input from human input is to use special hardware. For example, ultrasonic transducers can be placed at the periphery of a screen to sense ultrasonic pulses emitted by an active pen. It is also possible to use an infrared emitting pen and two or more cameras to triangulate the planar position on a screen. Yet another method uses a passive capacitive tip, which simulates a finger touch. The pen itself is powered and pressure sensitive, sending data to the device over Bluetooth. With timing information, it is possible to associate touch events with pen down events.

Another approach known in the prior art, uses resonance inductive coupling, which uses a special pen and sensor board that operates behind the conventional capacitive touchscreen. This technology is used in devices such as the Microsoft Surface and Samsung Galaxy Note. Similarly, another method uses a grid of Hall Effect sensors behind the touchscreen to sense the magnetic tip of a special pen. Also known is the use of a grid of infrared proximity sensors and computer vision to separate palm and finger inputs. Finally, advanced capacitive touchscreens can differentiate passive styli by looking at contact size and capacitive properties.

Even with special hardware for stylus support, simply distinguishing pen from finger is insufficient if the finger can still be used for input. In this case, unwanted palm touches may still be interpreted as finger touches in the absence of the pen. Thus, software is still needed to reliably distinguish pens and fingers from palms, which the above solutions do not address.

Although special styli tend to offer excellent precision, a significant downside is the need for a special purpose accessory, which is often platform-specific. Further, additional internal hardware is often required to support these pens, adding to the build cost, size and power draw of mobile devices. Thus, a software-only solution, which can be easily deployed and updated, is attractive. Further, software solutions offer the ability to disambiguate between finger and palm input. However, without an innate way to disambiguate touch events, software solutions must rely on clever processing or interaction techniques.

For optical multi-touch devices, one approach is to identify palm regions visible from the camera image. On mobile devices with capacitive screens, the task is more challenging, since applications generally do not have access to a hand image, or even the capacitive response of the touch screen. Instead, applications must rely on information about touch position, orientation (if available), and size. There are dozens of applications in the iOS and Android app stores that claim to have palm rejection features. Unfortunately, none of them adequately address the problem of palm rejection.

One method known in the art is to specify a special 'palm rejection region' where all touches are ignored, though this is unwieldy. Unfortunately, palm touches outside the input region can still provide accidental input (e.g. accidental button presses). One known method makes use of a more sophisticated geometric model to specify the rejection region, providing a five-parameter scalable circle and pivoting rectangle, which captures the area covered by the palm better than a rectangular region.

A second approach uses spatiotemporal features—looking at the evolution of touch properties and movement over a short time window. We hypothesize that applications that first draw, then remove strokes, must wait some period of time before detecting accidental touches. Prior art applications require the user to specify information regarding their handedness orientation and to use the tablet in a fixed orientation. Additionally, one prior art application requires users to specify one of three handwriting poses they use.

SUMMARY OF THE INVENTION

The invention is a novel, iterative, probabilistic approach to palm rejection. The system requires no initial configuration and is independent of screen orientation and user handedness. In one example, the approach is used on a platform without native palm rejection or stylus input. The approach, however, is platform agnostic and will work on any system that reports multiple touch contacts along with location and touch area.

BRIEF DESCRIPTION OF THE DRAWINGS

FIG. 3 shows the use of decision trees in the evaluation of the features and the voting process.

DETAILED DESCRIPTION OF THE INVENTION

Five properties distinguish palm from pointer (i.e., finger or stylus) inputs: 1) the touch area for palms tends to be large, whereas pointers have small tips; 2) on most touchscreens, the large palm contact area is segmented into a collection of touch points, which often flicker in and out; 3) these palm points tend to be clustered together, whereas the pointer is typically isolated; 4) stylus touches have a consistent area, unlike palms, which change in area as they deform against the screen; and 5) palms generally move little, while pointer inputs tend to have longer, smoother trajectories.

There is often significant context that exists before a touch point appears on the screen. For example, when dotting an 'i' the stylus touch might only exist for 50 ms, however, the palm might have been on the display for several seconds beforehand. As the present approach records all touch data, including data from before the touch in question, a more confident classification can be made.

Figure 1:
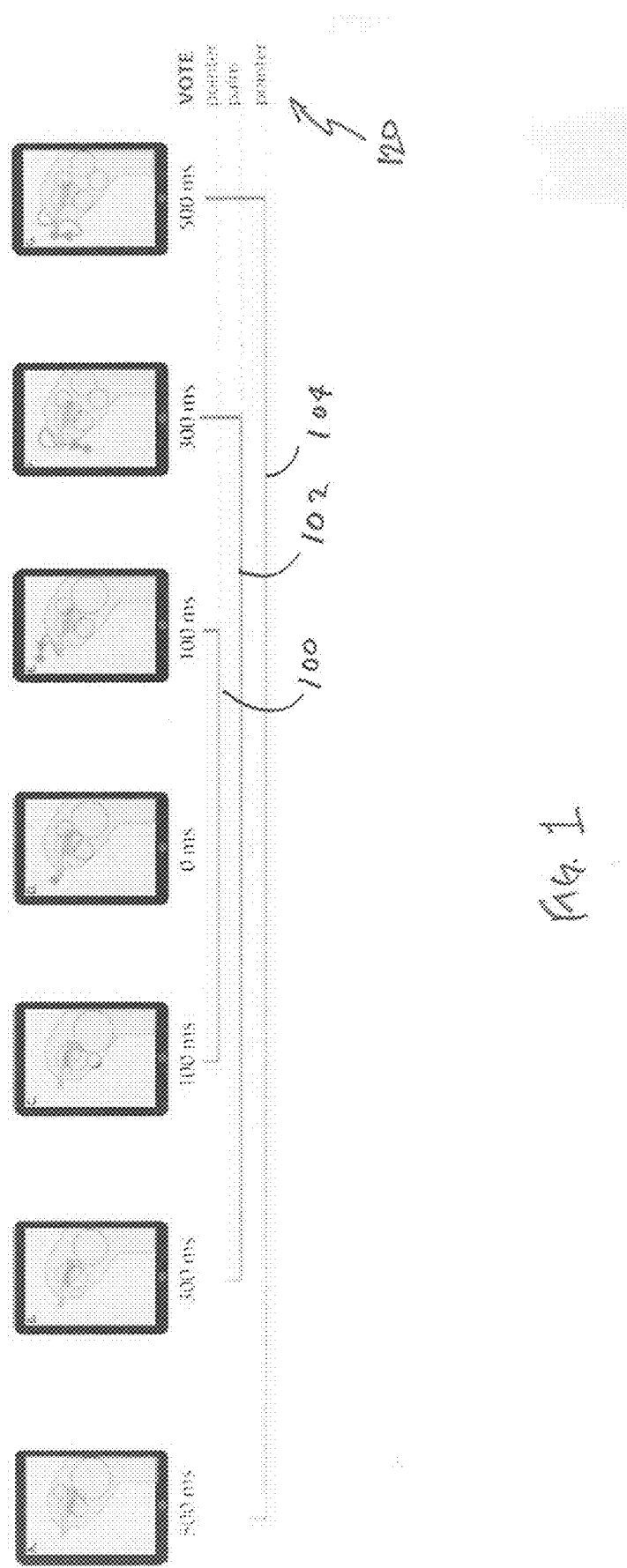
FIG. 1 presents an illustrated example of touches present at different points in time relative to a touch contact of interest (D, dot). Touch points due to palms (hollow circles) are often ephemeral, large, and have low velocity. Our approach extracts features and performs classification of each touch point at several points in time, using different sized time windows. In this example, we show how the classification for the dot changes as the window size changes.

In one embodiment of the invention, a series of features are used that characterize touch points of interest and their relationships to neighboring points. These features are computed over touch event sequences corresponding to a particular touch contact (which are needed to categorize the contact as either a stylus or part of a palm) and occurring over windows of time centered at t=0 (the birth of the touch point). The time window is expanded symmetrically about t=0, ensuring that data from before and after the initial touch event are included (FIG. 1).

Each touch event has a centroid position, which denotes the approximate center of the touch area, and a radius indicating the maximum distance from the centroid to the perimeter of the touch area. In one example, the features consist of statistics (mean/standard deviation/minimum/maximum) computed over sequences of touch events corresponding to a particular touch contact for each time window. These statistics are calculated for the radius of each event and speed and acceleration of consecutive events. Additional features include the total number of events in the sequence and mean/stdev/min/max calculated over the Cartesian distances between the centroid of the touch event at t=0 and all touch events in any concurrent sequences (belonging to other touch contacts). All of these features are rotation and flip invariant. This should minimize the effect of device and hand orientation, as well as handedness, on classification.

To understand which features discriminate palm from stylus, feature selection was performed on a training dataset using correlation-based feature subset selection with best first search. To determine the most important features, Weka, a collection of machine learning algorithms for data mining tasks, was used. Weka is a workbench of tools which enable a computer program to automatically analyze a large body of data and decide what information is most relevant. Minimum distance to other touches, number of touch events, and min/mean/max/stdev of touch radius are found to be most predictive.

The present method records all touch events reported by the touchscreen. In one example, after a touch point has been alive for at least 25 ms, the system classifies the touch as either "pointer" or "palm". In one example, if a touch terminates before 25 ms has elapsed, it is classified using all available data. At 50 ms after birth, another classification is performed. For every 50 ms thereafter, up to 500 ms since birth, this classification repeats—each time contributing a single "vote". A temporary touch type, either pen or palm, is assigned based on the majority of the votes accumulated thus far. After 500 ms, or if the touch point disappears (whichever comes first), voting stops, and the final vote is used to assign a permanent classification. Note that the vote implicitly encodes a confidence score that can be used in probabilistic input systems. This is illustrated in FIG. 1, showing votes 120. At 100 ms, the touch event is classified as a pointer touch. At 300 ms the vote changes to a palm touch, but at 500 ms, the vote is hanged back to a pointer touch.

Figure 2:
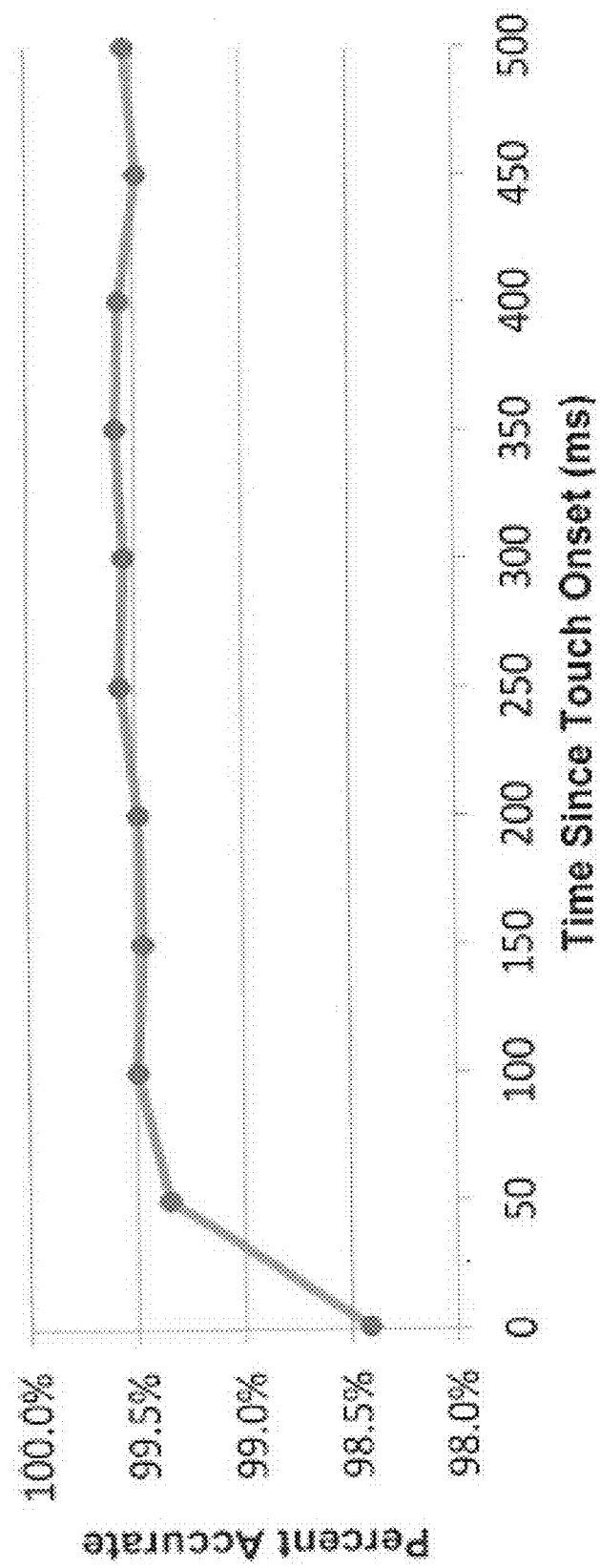
FIG. 2 shows classification accuracy (true positives) over different durations of time. Leftmost point is at t=1 ms.

In one embodiment, the iterative classification approach allows the system to show immediate feedback to the user. As shown in FIG. 2, the system initially shows its best guess (in one example, roughly 98% accurate) and refines this later as more information becomes available. For example, if a touch is initially guessed to be a stylus touch (a vote of 1), the application will render a stroke on canvas. If this guess is later changed (i.e., consensus reverses as more votes are contributed), the stroke is removed from the canvas.

In one aspect of the invention, eleven decision trees are trained using the features described in the previous sections with window sizes ranging from 50 to 1000 ms, for example, classifiers triggered at 25 ms, 50 ms, 100 ms, 150 ms, etc. up to 500 ms. FIG. 1 shows three such windows. At 100 ms, time window 100 is shown to have a width of 200 ms, centered on time t=0. Likewise, at 300 ms and 500 ms, windows 102 and 104 are shown to be 500 ms and 1000 ms in width respectively, also centered on time t=0.

The voting process is shown in FIG. 3. At 0 ms, or at the notification of the occurrence of the event, the event is classified using a decision tree 300, resulting in a vote 301 for the classification of the event as a palm touch. At the 50 ms window, extending from −50 ms to 50 ms, the features become more refined and are evaluated using decision tree 302, resulting in a vote 303 for the classification of the event as a pointer touch. Likewise, the event is evaluated again at the 100 ms window, using decision tree 304, resulting in another vote 305 for the classification of the event as a pointer touch. It should be noted that at −50 ms, the user's palm is touching the screen, denoted as event "P", but no pointer contact has yet been made. Nevertheless, the fact that the user's palm is present is a factor in the classification of point "S" as a pointer touch as opposed to a palm touch in decision trees 302 and 304.

Each tree was trained using touch features from all preceding windows up to the maximum window size. For example, the classifier triggered at 200 ms uses features obtained from window sizes of 50, 100, 200, 300 and 400 ms (windows are symmetric, centered on t=0). In one example, Weka is used to train the decision trees using the C4.5 algorithm.

In one example, training data was collected using a custom iOS application. For each training instance, a 1 cm radius dot was randomly placed on the screen. Users were told to place their palms on the screen however they saw fit, such that they could draw a stroke of their choosing starting in this circle. This procedure allowed for the collection of labeled pointer and palm point data. In total, 22,251 touch event instances were captured (of which 2143 were stylus strokes) from five people using a variety of hand poses, tablet orientations, and handedness.

To estimate the effectiveness of this iterative approach, the user study data was split into 11,373 training instances (from 3 participants) and 10,878 test instances (from 2 others). FIG. 2 shows test accuracy over increasing time windows. Classification at t=1 ms is included to approximate instantaneous classification. In one example, accuracy improves as window size increases, plateauing at around 99.5% at 200 ms. Classification can be continued out to 500 ms, but as FIG. 2 shows, the main accuracy gains occur in the first 100 ms. This experimental result underscores the importance of leveraging temporal features and also delaying final classification.

FIG. 2 shows that performing classification instantly (at t=1 ms) yields a classification accuracy of 98.4% (kappa=0.79). This is sufficiently accurate that real-time graphical feedback can be rendered immediately while only occasionally requiring later reversion. Reclassifying at 50 ms reduces errors by 44%. By continuing iterative classification and voting up to 100 ms, accuracy increases to ~99.5% (kappa=0.94), cutting the error rate by a further 29%.

An embodiment of this invention has been implemented using Apple's iPad 2 running iOS 6, however, those skilled in the art will recognize that the methods of the present invention could also be used on any system that reports multiple touch contacts along with location and touch area.

We claim:

1. A method for distinguishing between a palm touch and a pointer touch on a touch-sensitive screen of a computing device, comprising:
receiving notification of a touch event associated with the touch-sensitive screen from the computing device;
classifying the touch event based on a series of features that characterize the touch event and a relationship of the touch event to other events; and
periodically re-classifying the touch event over a time window centered at a time the touch event was received, wherein, for a re-classification of the re-classifying of the touch event, the time window expands symmetrically an equal amount of time forward and backward from the time the touch event was received, while maintaining the time window centered at the time, wherein, to facilitate the re-classifying of the touch event, the re-classification is based on the series of features, previous features obtained from a previous touch event associated with the touch-sensitive screen that occurred prior to the time, and subsequent features obtained from a subsequent touch event associated with the touch-sensitive screen that occurs subsequent to the time, wherein the previous touch event and the subsequent touch event occur within the time window, and wherein the classification and the re-classification contribute respective votes used to determine a final classification of the touch event.

2. The method of claim 1, wherein the respective votes contributed by the classification, the re-classification, and any other re-classification characterize the touch event as a palm touch or a pointer touch, and wherein the final classification is determined based on a type of classification of the touch event that has a majority of votes of a cumulation of the respective votes.

3. The method of claim 1, wherein the method further comprises:
presenting immediate feedback to a user if the touch event is classified as a pointer touch by rendering a stroke on the touch screen;
removing the stroke if a cumulation of the respective votes ever indicates that the touch event is to be classified as a palm touch.

4. The method of claim 1, wherein the features comprise statistics computed over a sequence of touch events, comprising the previous touch event, the touch event, and the subsequent touch event.

5. The method of claim 4, wherein respective touch events, including the touch event, the previous touch event, and the subsequent touch event, comprise a centroid and a radius, and wherein respective features of the respective touch events, including the series of features, the previous features, and the subsequent features, comprise a mean value, a standard deviation value, a minimum value, and a maximum value calculated for the radius of each touch event of the respective touch events.

6. The method of claim 5, wherein the respective features further comprise a total number of touch events in the sequence of touch events.

7. The method of claim 5, wherein the series of features further comprise Cartesian distances between the centroid of the touch event at the time the touch event was received and the centroids of other touch events of the respective touch events.

8. The method of claim 1, wherein the classifying is performed using a series of decision trees trained using the series of features or other features for varying window sizes of the time window, wherein the other features comprise the previous features and the subsequent features.

9. The method of claim 5, wherein the respective features further comprise a minimum distance to other touch events of the respective touch events and a number of touch events of the respective touch events.

10. The method of claim 1, wherein all touch events, including the touch event, the previous touch event, and the subsequent touch event, reported by the computing device are recorded and classified.

11. The method of claim 1, wherein the classification of the touch event occurs at approximately 25 ms after the touch event has been received.

12. The method of claim 1, wherein the re-classification occurs approximately 50 ms after the touch event has been received, and another re-classification occurs approximately 50 ms after the re-classification.

13. The method of claim 12, wherein the final classification occurs at a predetermined time or when the touch event terminates.

14. The method of claim 1, wherein the touch event lasts less than 25 ms, and wherein the final classification is based on data available at a termination of the touch event.

15. The method of claim 1, wherein the classifying comprises classifying the touch event upon receipt of the touch event.

* * * * *